(12) United States Patent
Li

(10) Patent No.: US 10,552,936 B2
(45) Date of Patent: Feb. 4, 2020

(54) SOLID STATE STORAGE LOCAL IMAGE PROCESSING SYSTEM AND METHOD

(71) Applicant: Alibaba Group Holding Limited, George Town, Grand Cayman (KY)

(72) Inventor: Shu Li, Santa Clara, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 338 days.

(21) Appl. No.: 15/058,530

(22) Filed: Mar. 2, 2016

(65) Prior Publication Data

US 2017/0256023 A1    Sep. 7, 2017

(51) Int. Cl.
*G06K 9/00* (2006.01)
*G06T 1/60* (2006.01)
*G06F 3/06* (2006.01)
*H04L 29/06* (2006.01)

(52) U.S. Cl.
CPC .............. *G06T 1/60* (2013.01); *G06F 3/0604* (2013.01); *G06F 3/0656* (2013.01); *G06F 3/0688* (2013.01); *H04L 65/4084* (2013.01)

(58) Field of Classification Search
CPC ....... G06T 1/60; G06F 3/0604; G06F 3/0656; G06F 3/0688; G06F 17/30244; H04L 65/4084
USPC .......................................................... 382/305
See application file for complete search history.

(56) References Cited

U.S. PATENT DOCUMENTS

| | | |
|---|---|---|
| 6,377,257 B1 | 4/2002 | Borrel et al. |
| 7,336,801 B2 | 2/2008 | Mehrotra et al. |
| 8,429,189 B1 | 4/2013 | Spielberg et al. |
| 8,495,675 B1 | 7/2013 | Philpott et al. |
| 8,732,266 B2 | 5/2014 | Maigatter |
| 8,875,209 B2 | 10/2014 | Jacobs |
| 8,922,676 B2 | 12/2014 | McNaughton |
| 9,116,973 B2 | 8/2015 | Werner |
| 9,152,947 B2 | 10/2015 | Sherman et al. |
| 9,171,278 B1 | 10/2015 | Kong et al. |
| 9,213,954 B2 | 12/2015 | Khalatov et al. |
| 2002/0116444 A1 | 8/2002 | Chaudhri et al. |
| 2003/0106492 A1* | 6/2003 | Levinson ............. B01J 19/0046 117/200 |
| 2006/0016890 A1* | 1/2006 | Chou .................. H04N 1/00222 235/454 |
| 2007/0250560 A1 | 10/2007 | Wein et al. |
| 2008/0159652 A1* | 7/2008 | Shimizu ................ G06T 3/4038 382/284 |
| 2009/0031369 A1 | 1/2009 | Jeffs et al. |

(Continued)

FOREIGN PATENT DOCUMENTS

WO    2014/210514 A1    12/2014

*Primary Examiner* — Andrew M Moyer

(57) ABSTRACT

The present invention facilitates efficient and effective information storage device operations. In one embodiment, an add-in card for image processing selectively storing information includes a processing component that performs image processing locally on the add-in card and also directs selective image based storage of original image information and results of the image processing using a unique tag; a solid state storage device that selectively stores the original image information and results of the image processing, and a communication port that receives the original image information and selectively forwards the original image information and results of image processing on the original image information.

17 Claims, 10 Drawing Sheets

(56) References Cited

U.S. PATENT DOCUMENTS

| | | |
|---|---|---|
| 2010/0057846 A1 | 3/2010 | Zhang |
| 2011/0214059 A1 | 9/2011 | King et al. |
| 2012/0016933 A1* | 1/2012 | Day ................... H04L 63/102 |
| | | 709/203 |
| 2013/0159285 A1 | 6/2013 | Dees et al. |
| 2013/0212211 A1* | 8/2013 | Maigatter ............... G06T 11/60 |
| | | 709/217 |
| 2014/0141890 A1* | 5/2014 | Nishimura .............. A63F 13/12 |
| | | 463/42 |
| 2014/0181154 A1 | 6/2014 | Amulu et al. |
| 2014/0201471 A1 | 6/2014 | Cutter et al. |
| 2014/0267439 A1* | 9/2014 | Jenkins ................ H02M 3/157 |
| | | 345/668 |
| 2014/0281084 A1 | 9/2014 | Fleischer et al. |
| 2014/0281100 A1 | 9/2014 | Fleischer et al. |
| 2015/0138219 A1 | 5/2015 | Zacharias et al. |
| 2016/0077758 A1* | 3/2016 | Carter ................... G06F 3/0623 |
| | | 711/3 |

* cited by examiner

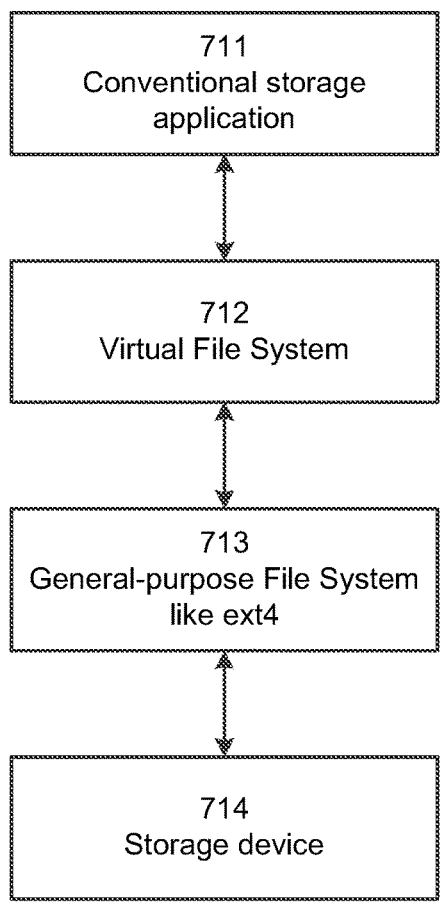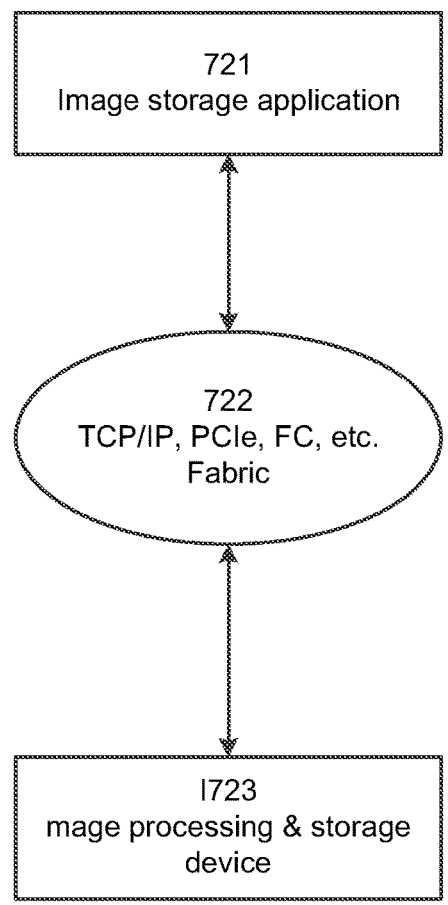
Fig. 7A
Fig. 7B

SOLID STATE STORAGE LOCAL IMAGE PROCESSING SYSTEM AND METHOD

FIELD OF THE INVENTION

The present invention relates to the field of information processing and storage.

BACKGROUND OF THE INVENTION

Numerous electronic technologies such as digital computers, calculators, audio devices, video equipment, and telephone systems facilitate increased productivity and cost reduction in analyzing and communicating data and information in most areas of business, science, education, and entertainment. Frequently, these activities involve communication and storage of large amounts of information and the complexity and costs of networks and systems performing these activities are often immense. As vast networks of numerous devices are interconnected (such as in the Internets of Things (IoT)), there are a number of issues and problems that can adversely impact performance.

One traditional environment involves the processing and creation of content on relatively few servers (referred to as source servers) and delivery of the results to numerous end-use devices or terminals via the internet. The end-use devices typically operate on information in numerous different formats and configurations. For example, image information can be requested in different formats (e.g., JPEG, WebP, etc.) with numerous visual effects (e.g., various resolutions, zoom-in/out, etc.). Traditionally, the end-use devices or terminals often request information in a particular format and configuration. The source servers perform the corresponding processing and forward the results.

In conventional systems, there are significant burdens or responsibilities imposed on the source servers. For example, in conventional systems the source servers must often remain generalized in order to perform numerous different requisite tasks (e.g., direct control functions, image processing, database processing, storage management, etc.). In traditional environments there are often a large number of end-use devices spread out over vast geographical areas. The end-use devices forward numerous requests for immense amounts of information and tend to create long queues at the relatively few source servers. The source servers essentially become bottlenecks or checkpoints that can cause response delays and adversely impact an end-use experience.

Some traditional approaches include content delivery network (CDN) servers in an attempt to improve performance. However, the CDN servers typically are limited in their ability to alleviate the bottleneck problems. For example, conventional CDN servers do not help much for requests that require additional processing, as these requests requiring additional processing must be forwarded to the source servers. Requests for images that are not stored on the CDN servers also must be forwarded to the source servers. Even if the requested image is stored locally on the CDN servers, the CDN servers often utilize file management systems based on logical addressing of relatively small amounts of information that are uniform in size. The conventional file management systems typically involve relatively large amounts of management operations that slow down response time.

SUMMARY

The present invention facilitates efficient and effective information storage device operations. In one embodiment, an add-in card for image processing and selectively storing information includes: a processing component that performs image processing locally on the add-in card and also directs selective image based storage of original image information and results of the image processing using a unique tag; a solid state storage device that selectively stores the original image information and results of the image processing, and a communication port that receives the original image information and selectively forwards the original image information and results of image processing on the original image information. The processing component: determines if image processing is required to respond to a request for image information; retrieves the original image information if image processing is required; performs image processing on the original image information; and forwards the results of the image processing in response to the request for image information. The unique tag or key is generated on an image by image basis and is used to locate corresponding original image information for loading, processing, and saving. Results of the processing produce additional image information and an additional unique tag can also be associated with the additional image information on an image by image basis. The storage device can selectively store the additional image information using the additional unique tag. The image information is stored without file system storage management or a logic block address layer.

In one embodiment, a CDN server method includes the following: evaluating an image information access trigger; accessing image information in accordance with the evaluating; and processing the image information locally in a content delivery network server; including selective storage of image information. The handling includes selectively storing original image information in an image based storage system. The handling includes selectively storing processed image information in an image based storage system, wherein processed image information includes results of the processing. Evaluating an image information access trigger can include evaluating where the information is stored. Evaluating an image information access trigger can also include determining if a user request is directed to original image information. Evaluating an image information access trigger includes determining is a user request is directed to processed image information. The accessing includes retrieving image information that is locally stored if the evaluation indicates the information is locally stored. The accessing includes retrieving image information from a remote storage if it is not locally stored. The processing includes forwarding the image information in response to a request. The method can also include generating a unique key corresponding to the processed information.

In one embodiment, a content delivery network server includes a plurality of NAND dies that includes a plurality of page buffers and a field programmable gate array (FPGA). When the page buffers are active for normal storage transfers the page buffers hold data to be written in the NAND dies and when the page buffers are inactive for normal storage transfers the page buffers are used to store intermediate information. The field programmable gate array (FPGA) performs image processing and storage controller operations, including controlling information storage in the plurality of local NAND dies. The internal buffer can be an internal page buffer inside a NAND FLASH LUN.

DESCRIPTION OF THE DRAWINGS

The accompanying drawings, which are incorporated in and form a part of this specification, are included for exemplary illustration of the principles of the present invention and are not intended to limit the present invention to the particular implementations illustrated therein. The drawings are not to scale unless otherwise specifically indicated.

FIG. 7A shows a conventional IO path for the conventional file storage in a data center.

FIG. 7B is a local CDN server processing storage IO path in accordance with one embodiment.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail so as not to unnecessarily obscure aspects of the current invention.

In one embodiment, local CDN server processing and storage innovatively enhance image processing computation and storage efficiency. The image computation engine and the storage controller are implemented locally in the CDN server. The engine is implemented in a local storage control field programmable gate array (FPGA) which is located close to the Flash storage media. The FPGA can be considered a format of in-memory computing designed to respond to image processing demands. The system can include a FPGA for high-efficiency image processing and storage control, a unique tagging method for image addressing, the DRAM-less low-cost design, and the high-capacity NAND flash storage.

Figure 1:
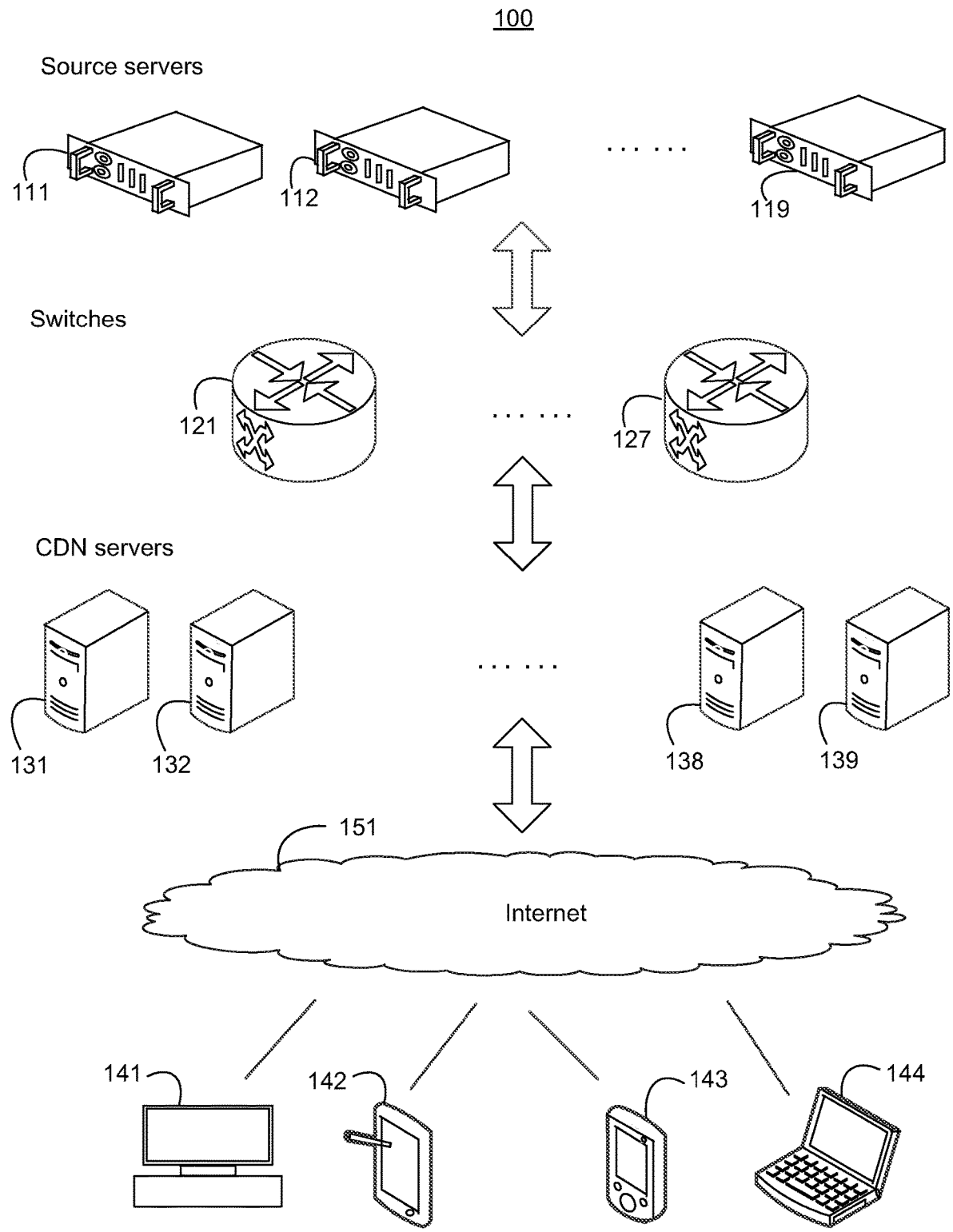
FIG. 1 is an illustration of an exemplary network in accordance with one embodiment.

FIG. 1 is an illustration of an exemplary network 100 in accordance with one embodiment. The exemplary network 100 includes source servers 111, 112 and 119, switches 121 and 127, local image processing content delivery network servers 131, 132, 138 and 139, internet 151 and end-use devices or terminals 141, 142, 143 and 144. There can be a variety of end-use devices, including a personal computer, a tablet, a smart-phone, a laptop, and so on. The source servers perform processing and store the initial or original images. The switches route information between the source servers and the content delivery network servers. The local image processing CDN servers perform processing and selectively store image information. The stored image information can include selected received information (e.g., original image information, information received from a source server, etc.) and selected information resulting from image processing performed by the CDN servers. The processing performed by the CDN servers can include processing associated with user requests (e.g., zoom in, zoom out, etc.). The internet communicates information between content delivery network servers and end-use devices. The end-use devices are a platform for user interactions. In one exemplary implementation, the network 100 involves image processing systems for IoT cloud environments.

In one embodiment, CDN servers initially have no images stored in them. The CDN servers receive original images from the source servers. The CDN servers perform selective local storage of original images and processed images. In one exemplary implementation, CDN servers automatically recognize original and processed images which are more likely to be accessed in the future and cache them with local storage based upon image tag addressing. Generally, CDN servers are distributed based on geographical, economical, and many other purposes, and CDN servers extend to numerous regions based on users' demands. When a user requests processed images, unlike the traditional approach of going back to the source servers for processing if a processed result was not previously stored in the CDN server, the local CDN server processing storage system enables offloading of the image processing computation from source servers' CPU to CDN servers' FPGA. By doing so, instead of holding multiple processed results of one image, a CDN server can store the original image and perform image processing locally. In response to a user's request, a CDN server FPGA is used to process the original image in a real-time manner and send the results back to the user.

Figure 2:
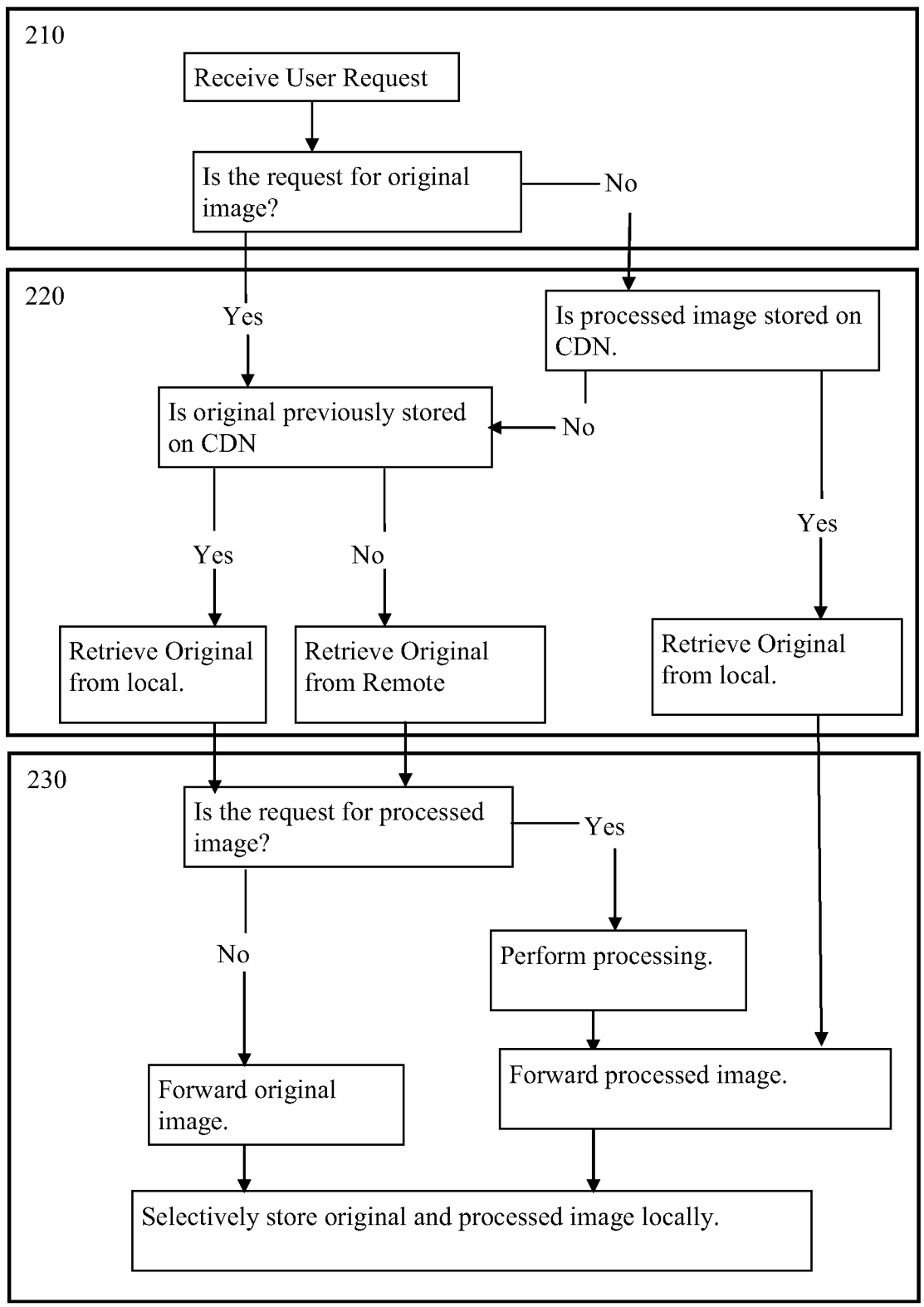
FIG. 2 is an illustration of an exemplary network in accordance with one embodiment.

FIG. 2 is a flowchart of an exemplary local CDN server processing and storage method 200 in accordance with one embodiment.

In block 210, an image information access trigger is evaluated. The trigger can be a user request for image information. A determination is made if the request is for information associated with an original image.

In block 220, image information is accessed in accordance with the evaluating. If the request was not for an original image, a determination is made if a processed image satisfying the request is stored locally on the CDN server. If the processed image is stored locally, the processed image information is accessed locally and forwarded to block 230 for handling. If the processed image is not stored locally or if the request was for an original image, a determination is made if the original image was previously stored on the CDN server locally. The determination of whether the original image was previously stored on the CDN server locally can be directed to an original image associated with the processed image. If the determination indicates the original is stored locally, the image is accessed locally and forwarded to block 230 for handling. If the determination indicates the original is not stored locally, the image is retrieved from a remote storage and forwarded to block 230 for handling. If not available locally, the original image can be loaded from the source server and transferred to the CDN server.

In block 230, the image information is processed locally in the CDN server in accordance with the evaluating, including handling selective storage of the image information. After accessing original image information, the CDN servers' FPGA processor performs the corresponding image processing and responds to the user with the processed result, rather than the CPU in the CDN server. The CDN server selectively decides whether or not to keep or store the image information (e.g., original image, processed image, etc.). Performing the image processing locally on the CDN server further accelerates the image delivery and enhances the user experience.

However, this local CDN server processing and storage system is not just an assistant of the CDN server CPU. The local CDN server processing storage system can also selectively store the images locally to meet users' future requests by directly loading the processed file results into local storage resources. This is implemented through the local CDN server processing storage mechanism according to the different image request scenarios.

The CDN servers make the decision to selectively store image information in accordance with various criteria. Based on experience dealing with image request characteristics, the CDN servers try to predict future requests, and traditional CDN servers decide whether or not to store the processed image locally in their storage devices or not. However, the dilemma for conventional approaches lies in the cost associated with either enlarged storage capacity or network and computation resource occupation. Conventional CDN servers typically only work as levels of cache stored in a traditional manner and the conventional source server provides the computation and the original image. While a conventional system may rely on CDN servers and source servers to form the infrastructure hierarchy, the source servers perform the image processing, not the CDN server. When a user sends a request to process an image, the CDN servers search for results or a version of the image previously processed by the source server CPU and stored in the CDN server. However, successful location of the results within the CDN server depends upon two factors. The exact same processing had previously been carried out by the source server CPU, and the processed results were stored on the CDN servers for future use. If both of these conditions exist the processed image results are sent from the CDN servers without having to go back to the source servers.

Requests for processed image information are usually sent back to the source server since it is rare they can be satisfied locally by a conventional CDN server. The odds that multiple user requests and corresponding processing results match exactly are relatively low. In addition, given the large number of possible original images and exponential number of different processing results that can be derived from the original images, the odds that a decision is made to store all of the image results is very low. Conventional CDN servers typically do not have the capacity to store all of the images. For a conventional system to have a high CDN server hit rate, a large storage capacity is required to hold as many different versions of processed images as possible from the same original image. If a CDN server experiences misses or the CDN server can not locate the requested version of processed image results, the conventional systems usually have to go back to the source servers to load the original image. The image processing to process the original image into the requested results (format, etc.) is run on the source servers. The processed image results are sent back to a CDN server, which in turn forwards the processed image results in response to the user request.

The local CDN server processing storage system facilitates a streamline efficient approach, unlike traditional approaches. The local CDN server image processing enables more efficient responses using either or both less storage resources and communication bandwidth. In regions where users frequently upload the new images but request limited different versions requiring processing, then, the local CDN server processing system can store a significant number of the original images. In this scenario, a user's preference is mainly for archival or low frequency visits. The Broader Gateway Protocol (BGP) bandwidth is reduced since a number of the original images are stored locally on the CDN servers. Mainly, the original version is kept, and the FPGA does image processing (mainly to meet the needs of adjustments like visits from different terminals, for example, the same image is adjusted into individual versions for PC, tablet, smart phone, but those version can be generated per user requests on the fly).

In other situations, many different versions of processed images are requested (e.g., in situations where certain users provide services like photo enhancement, 3D visualization, comic production, image analysis, etc). The policy for this kind of usage can include storing of some processed versions locally. The stored content can include an image processing result which is frequently requested by users, and intermediate results for multiple hot image processing results that are frequently requested by a user. When the image processing results are frequently requested, the caching mechanism identifies requests that have a high likelihood of occurring again (e.g., using well known algorithms like least-recent visit, etc.) According to accumulated knowledge or experience (e.g., from requests, social events, etc.), some processed results are stored in a CDN server's add-in card's NAND flash media. In situations where intermediate results are requested, primarily in projects that are relatively big and complex, the amount of work to get the results is known and it may not be desirable to start from scratch (e.g., from the original images) every time. Information other than the final result can be stored. An analysis can indicate that certain projects share a sub-module and a certain middle stage. Based on those observations, a middle database or breakpoint is stored, and local image processing starts from there to obtain the final results while accelerating the overall delivery to users compared to traditional approaches.

Figure 3:
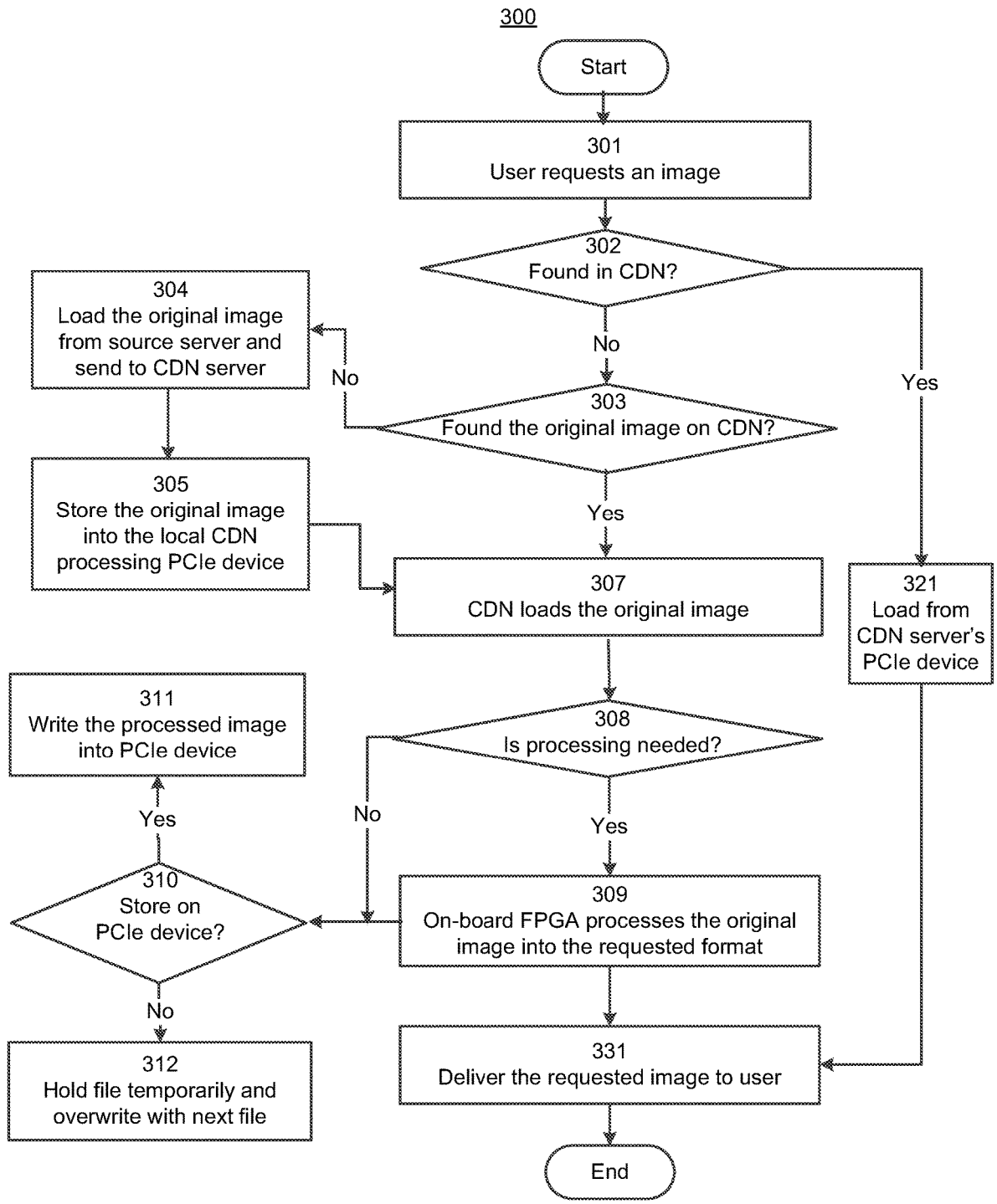
FIG. 3 is an exemplary flowchart of another local CDN server processing and storage method in accordance with one embodiment.

FIG. 3 is an exemplary flowchart of another local CDN server processing and storage method 300 in accordance with one embodiment. Again, processing is performed locally in the CDN server. In block 301, a user request is received. In block 302, a determination is made if the image is store locally in the CDN server. If yes, the process proceeds to block 321. If the image is not stored locally in the CDN server the process proceeds to block 303. In block 303, a determination is made if the found image was an original image. If the found image was an original image the process proceeds to block 307. If the found image was not an original image the process proceeds to block 304. In block 304, the original image is loaded from the source server and sent to the CDN server. In block 305, the original image is selectively stored in the local CDN server processing system. In block 307, the CDN server loads the original image. In block 308, a determination is made if processing is needed. If processing is not needed the process proceeds to block 310. If processing is needed the process proceeds to block 309. In block 309, the onboard FPGA processes the original image into the requested format. In block 310, a decision is made whether or not the image is to be stored locally. In block 311, the processed image is stored locally. In block 312, the file is held temporarily and overwritten by the next file. In block 321, the image is loaded from the CDN servers' PCIe device. In block 331, the requested image is forwarded to the user.

Figure 4:
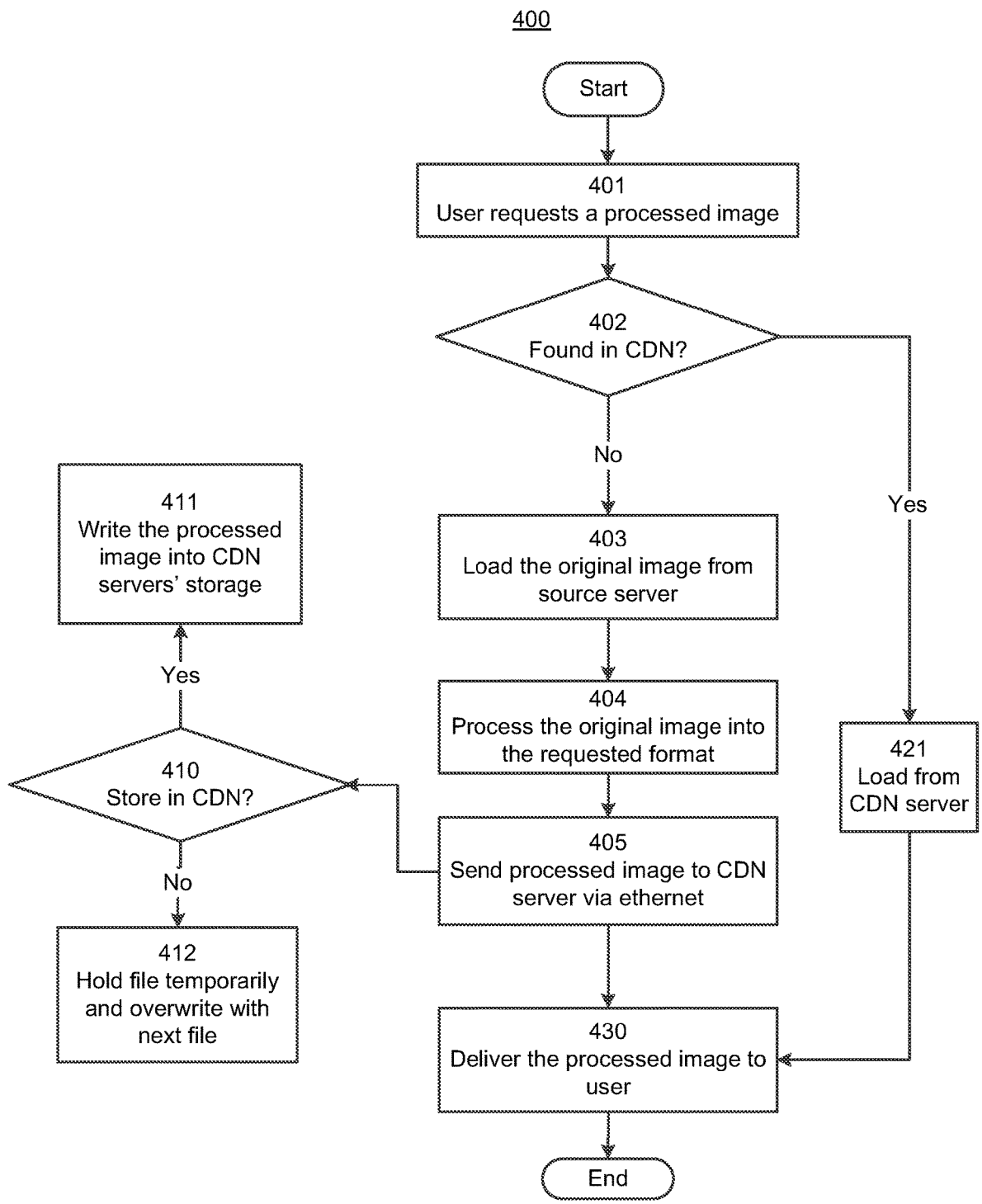
FIG. 4 is an exemplary flowchart of a typical conventional image processing and storage approach in accordance with one embodiment.

FIG. 4 is an exemplary flowchart of a typical conventional image processing and storage approach 400. As illustrated in the flowchart, if the image is not available in the CDN server it is forwarded to the source server for processing. In block 401, a user request is received. In block 402, a determination is made as to whether the image is stored locally in the CDN server. If yes, the process proceeds to block 421. If the image is not stored locally in the CDN server the process proceeds to block 403. In block 403, the original image is loaded in the source server. In block 404, the source server processes the original image into the requested format. In block 404, the processed image is sent to the CDN server. In block 410, a decision is made whether or not the image is to be stored locally in the CDN server. In block 411, the processed image is stored locally. In block 412, the file is held temporarily and overwritten by the next file. In block 421 the image is loaded from the CDN server. In block 430 the requested image is forwarded to the user.

Traditional methods typically involve frequent accesses of the source server clusters which are generally located in a central portion of network deployment, and the CDN server clusters are generally distributed more widely geographically, so much is spent on the BGP resource. The traditional CDN servers have to forward the requests involving processing back to the source servers to perform the processing, which introduces delays and occupies significant communication bandwidth. In one embodiment, the local CDN server processing approach reorganizes the architecture and changes the responsibility assignment of the image processing service. The image processing operations are moved from a source server's CPU to a CDN server's add-in card with a FPGA processor. A copy of the original image is selectively stored on the CDN server's add-in card's local storage. The local CDN processing system visits the source server for the 1st time to load the original version of the image, and the later processed versions are generated by the CDN clusters themselves which also makes the response to users fast. More importantly, expensive network bandwidth is not overly occupied. Furthermore, the caching algorithm can be optimized, and processed images are selectively chosen to be stored on CDN servers, taking both the storage capacity occupation and the computation load/response time into account.

Figure 5:
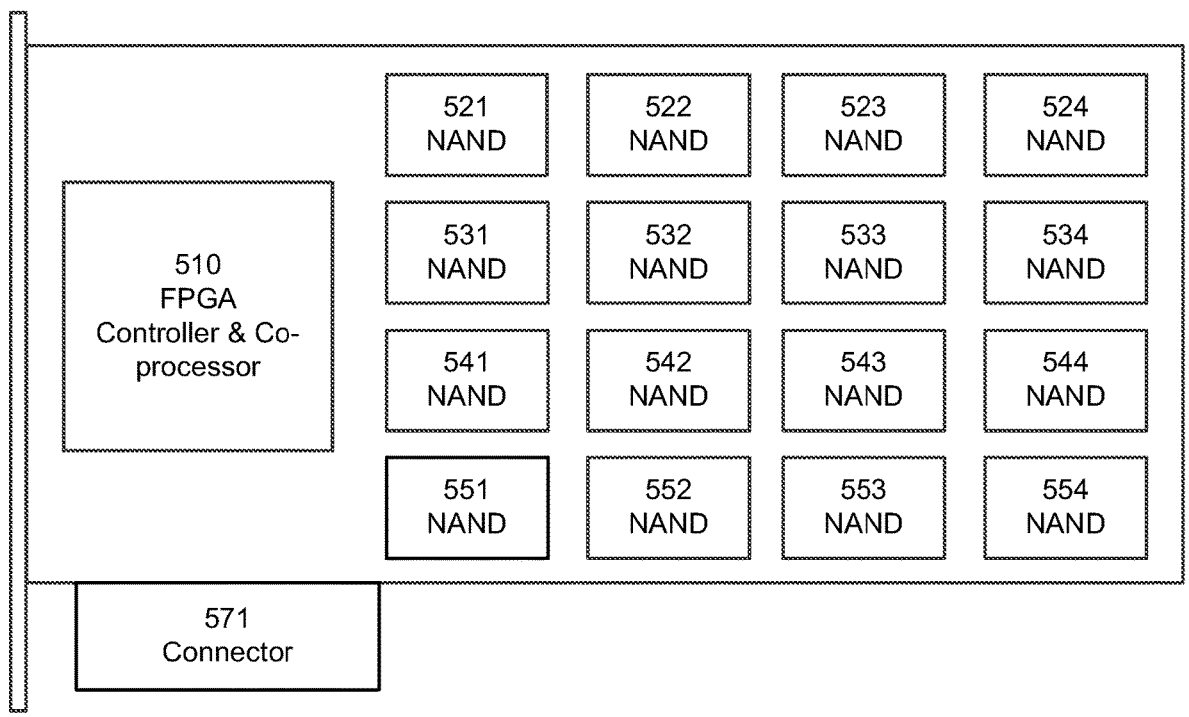
FIG. 5 is an illustration of one example of an add-in card hardware structure in accordance with one embodiment.

This local CDN server processing storage approach uses the FPGA as both image processor and storage controller in this system. FIG. 5 is an illustration of one example of an add-in card hardware structure 500 in accordance with one embodiment. The add-in card is a major module in the local CDN server processing storage system. The add-in card is plugged into the CDN server. A PCIe slot can be used. After receiving an original image transferred from the source server (e.g., through a communication network, ethernet, etc.), the FPGA processor handles the data being received. Shortly after the data is received and stored, the processed image is generated locally by the FPGA and is ready to be sent to users (e.g., through a communication network, ethernet connections, etc.). Aside from the resources of the FPGA allocated for image processing, the remaining resources of the FPGA can be designed as the controller of the solid state storage. The form factor of the add-in card can vary in accordance with a number of criteria (e.g., server chassis design, throughput requirements, capacity expectations, thermal dissipation, etc.). The card is not limited to a particular shape.

FIG. 5 illustrates one exemplary hardware organization and shape or form factor of an add-in card in accordance with one embodiment. The add-in card can include multiple packaged NAND flash integrated circuits (ICs) 521 through 554, a FPGA controller and coprocessor 510, and connectors or communication ports 571. To ensure the storage capacity, a high-capacity package can be used. In one exemplary implementation, 8 or 16 dies are grouped in the same IC. To further accelerate the write and read throughput and reduce latency, a 4-plane NAND flash can be used instead of the 2-plane or single-plane NAND.

In one embodiment, the system is implemented on a single add-in card, unlike conventional systems of processor, memory, and storage drives in the form of a server. The add-in card in FIG. 5 integrates the image processing and the flash storage device together. Through the PCIe bus, the add-in card can directly communicate with the NIC for ethernet transfer, and the local CDN system can directly receive and send images from other nodes through ethernet and fulfills the function of a whole server in the existing system.

The add-in cards can be used in a variety of environments. In one exemplary implementation, the add-in cards are used in a data center environment. From the data center operation point of view, the add-in card improves efficiency and reduces total cost of ownership (TCO) aspects. The add-in cards can help lower power consumption. Traditionally, one server consumes more than 500 w, and a CPU itself burns around 120 w or more. However, the local CDN server processing storage based system power can be controlled below a lower power consumption. In one example the power for an add-in card is 25 w. The add-in cards can also enhance or increase rack density characteristics. The low power consumption of the local CDN server processing add-in card not only helps meet rack power budgets, but also makes the thermal design easier. The standard PCIe form factor (e.g., HHHL) can be used, and consequently, each add-in card occupies a very small space. More nodes can be deployed in the same rack, which can help reduce the overall number of racks. Less data centers need to be built to reach the same scale and provide the same level of services. The local CDN server image processing storage system is not just a general use coprocessor (like GPU or general FPGA). This local CDN server image processing storage system provides a revolutionary system for the future-generation image service infrastructure, characterized by high throughput, low latency, low power consumption, low network traffic, and consequently, reduced TCO.

Figure 6:
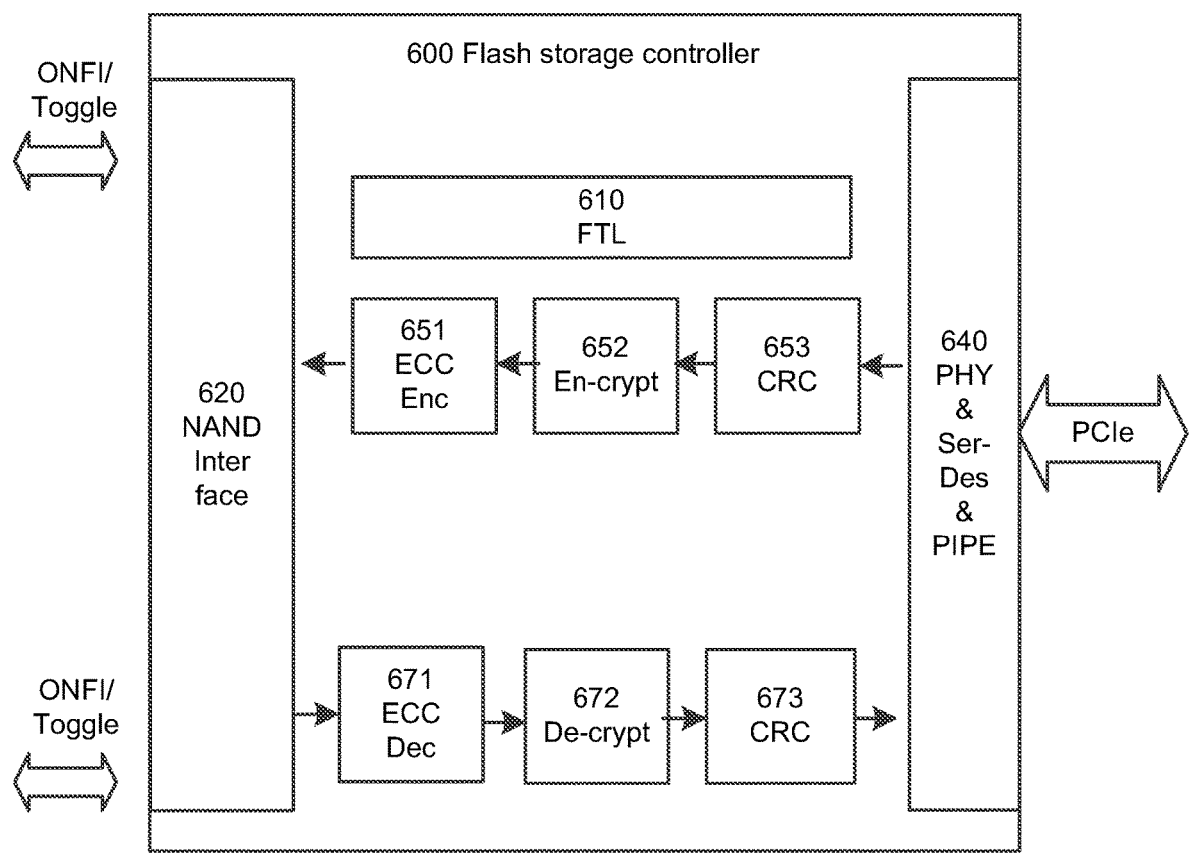
FIG. 6 shows example of a flash storage controller in accordance with one embodiment.

FIG. 6 shows an example of a flash storage controller 600 in accordance with one embodiment. The flash storage controller 600 includes a FTL 610, a NAND interface 620, a PCIe interface 640, an ECC encoder 651, an encryption engine 652 and a CRC module 653, an ECC decoder 671, a decryption engine 672 and a CRC module 654. The internal modules of the flash storage controller are implemented by resources on a single FPGA where the image processor is located. The flash controller technology is mature, and it handles the image loading and storing operations. In one embodiment, the FPGA is compatible with a PCIe flash storage controller architecture.

In one embodiment, the local CDN image processing storage system also improves the overall efficiency by bypassing the file system. Traditionally, the file system partitions the files in a user space into logic units with equal sizes, and converts the data into IO operations directed to read/write drives. The conventional approach increases the software stack overhead, increases response time, and complicates the control mechanism. In social media, e-commerce, and other business applications, image sizes are becoming bigger and bigger (e.g., several MB). Traditional file systems, such as ext4, partition information into logic units as small as 4 kB. One drawback of a traditional file system is that it does not match with NAND flash characteristics, and, consequently, leads to the low-efficiency usage of flash storage.

In one embodiment, a determination is made if processing is based on file content by file content, and if so then the information is addressed with a tag based upon the file. In one example, image information is processed image by image and an address tag is assigned. An image can be a stand-alone identity, and the related processing is based on image by image. Therefore, to address the image files, the image based storage bypasses the file system and directly assigns one non-repeatable index or tag for each image file. Through this unique tagging system, the individual image is located for loading, processing and saving with reduced latency.

FIG. 7A shows a conventional IO path for the conventional file storage in a data center. A conventional IO path includes a conventional storage application 711, a virtual file system 712, a general purpose file system 713, and a storage device 714.

FIG. 7B is a local CDN server processing storage IO path in accordance with one embodiment. The local CDN server processing storage IO path includes an image storage application 721, a communication fabric 722 and an image processing and storage device 723. There is no file system like conventional virtual file system 712. The local processing CDN server generates a unique key for each image to be stored. The image can include an original image or local image processing results. The unique key can be implemented by the self-developed software. The CDN server keeps a key library and sends both the image and its key to the image processing and storage device. In one exemplary implementation, the process includes a decision as to whether or not to store the original image. Meanwhile, if the image is requested to be further processed, the processed image is generated by the FPGA where the key of the processed image is also generated. Then, the processed image is sent to the user. Furthermore, if the processed image is selectively stored, it is stored and its key is sent to the key library.

It is appreciated that there are variety of unique tagging approaches. In one embodiment, a file is given a name or tag that is considered unique. A group of information related to the image (such as the file's name, directory, create date, modified date, version number, resolution, etc.) are concatenated to form a string of characters. The string can be denoted by an identifier (e.g., String_concat, etc.). A hash function is applied to generate a hash value (e.g., of String_concat, etc.). To reduce the likelihood of hash collision, multiple hash functions are used to generate the keys, which are later combined together to form the unique tag. A library is created to track or maintain the hash value and the image file.

Figure 8B:
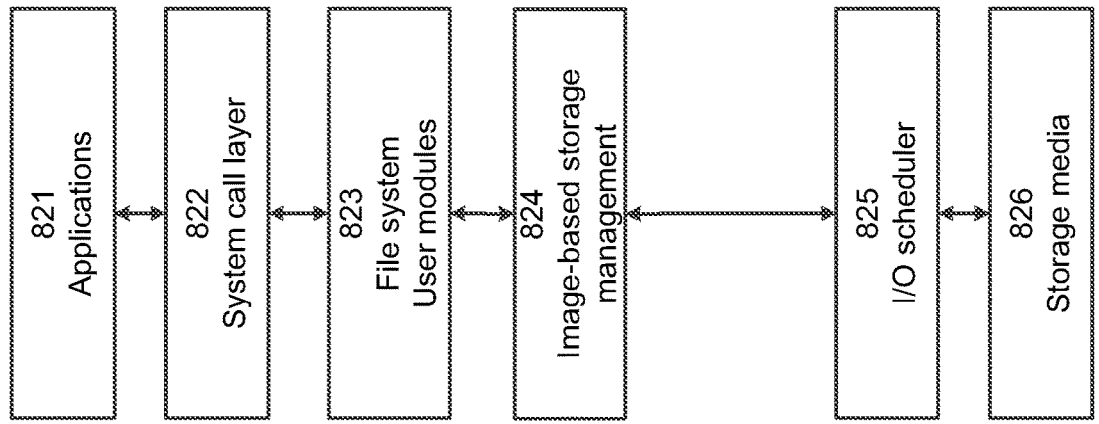
FIG. 8B is a local CDN server processing image-based storage system in accordance with one embodiment.
Figure 8A:
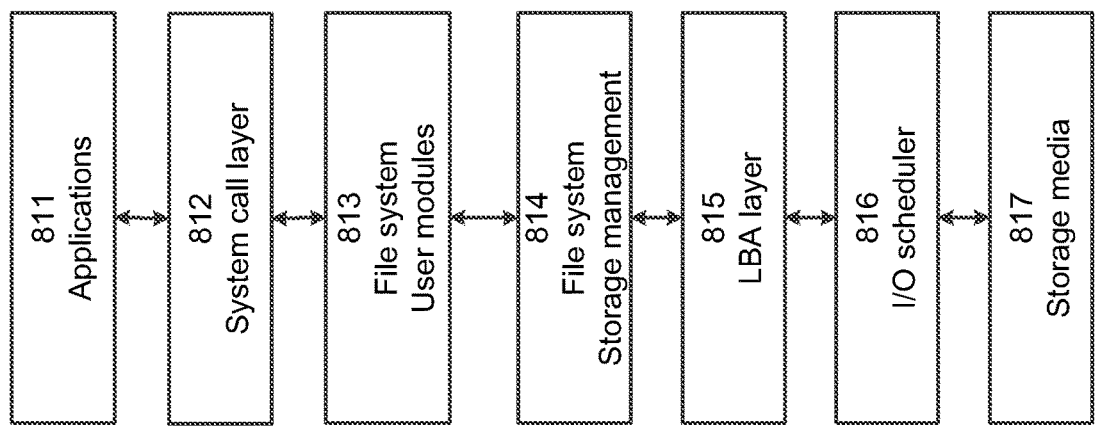
FIG. 8A is a conventional storage system design approach.

FIG. 8A and FIG. 8B illustrate storage system design approaches. FIG. 8A is a conventional storage system design approach and FIG. 8B is a local CDN server processing image-based storage system in accordance with one embodiment. The conventional storage system design 810 includes an application 811, a system call layer 812, a file system user modules 813, a file system storage management 814, a logical block address (LBA) layer 815, an IO scheduler 816 and a storage media 817. The local CDN server processing image-based system design includes an application 821, a system call layer 822, a file system user modules 823, an image based storage management 824, an IO scheduler 816 and a storage media 827.

In conventional storage systems, the drives are divided into blocks with equal size denoted as Scf. In parallel, the file to be stored is also partitioned into the small chunks whose size is Scf as well. The general-purpose storage meets all files' characteristics for a broad-range adoption. Therefore, Scf is traditionally small so that less drive space will be wasted. When one file or its modulo part is less than one block which is called logic sector in some scenarios, the unoccupied portion of this block is filled with a certain fixed pattern (e.g., all-1s, all-0s, other combinations of 1s and 0s, etc.). The finer the granularity is, the more complicated the file system management is. Image sizes are generally tens of times larger than the file system block. Furthermore, the access style of an image is using each image rather than an equal-sized sector as the unit. Therefore, the image-based storage improves the efficiency compared with the conventional storage. The image-based storage keeps less metadata, and also discards the LBA layer through the path as shown in the comparison of FIGS. 8A and 8B.

In the image-based storage system, the image file is passed through the system call and user module interface. Then, an image-based storage management includes a layer where each file is tagged with a unique ID. When the image is written into the storage, the unique ID and the offset in physical media work together for addressing, and the addressing information is used as the metadata in the local CDN server processing system. Therefore, when looking into the media, what is seen are the images with various sizes, and they are stored one by one closely together. In parallel, the master can store and manage the metadata for data control purposes. The information used to generate the unique tag can include many different types of data, which increases the uniqueness of the tag. For example, created time, user IP, file size, resolution, modified time, CDN ID, etc. are all concatenated together even with the online generated random numbers. This long string is further encoded with hash functions (e.g., SHA-3, Murmur, etc.) which forms a unique ID. In one exemplary implementation, the collision likelihood is lower than 10-120 and as a practical matter multiple files do not share the same ID.

Figure 9:
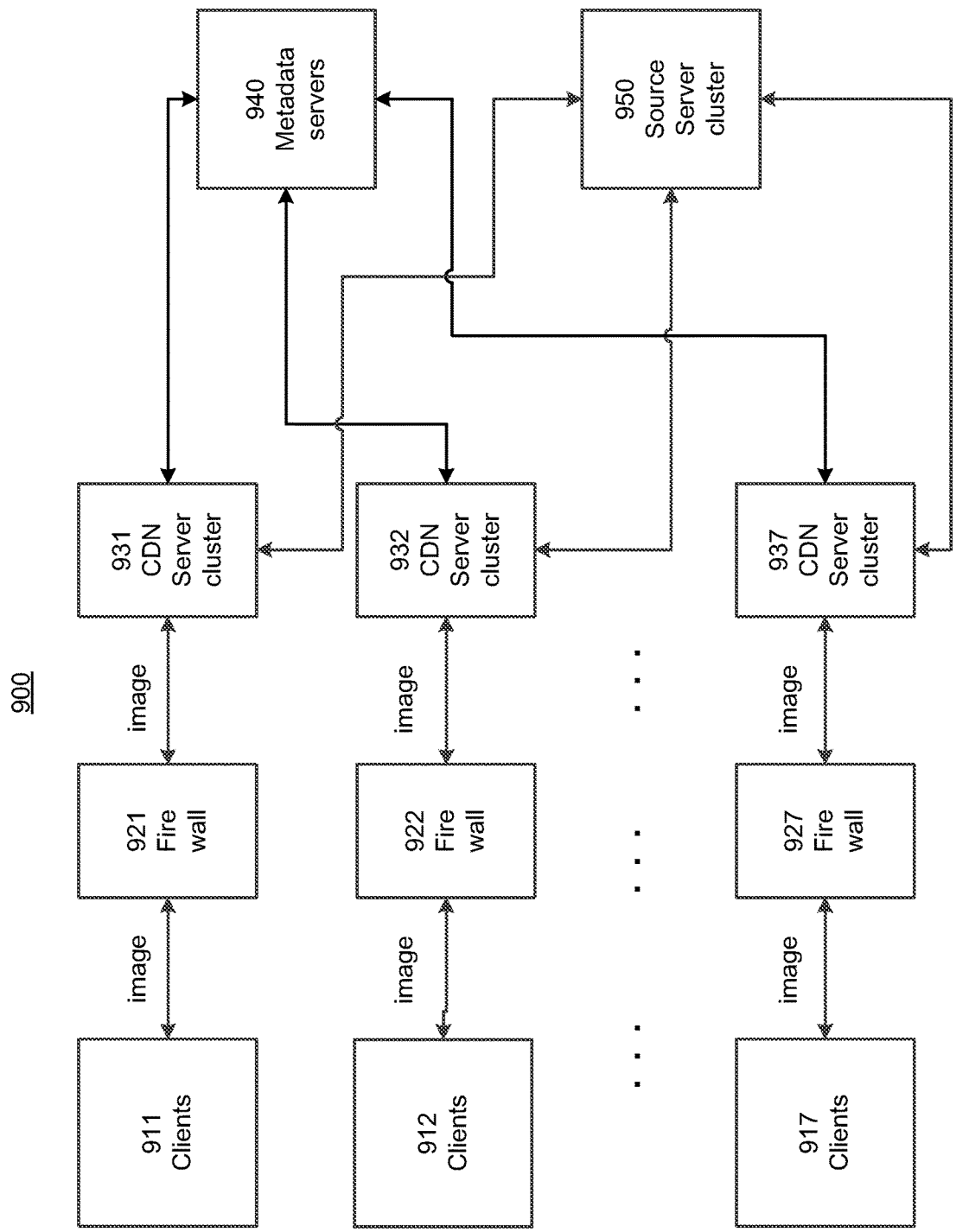
FIG. 9 illustrates one example of a CDN server image-based storage system topology in accordance with one embodiment.

FIG. 9 illustrates one example of a CDN image-based storage system topology 900 in accordance with one embodiment. The mechanisms and flow for a CDN image-based processing and storage system and how it is deployed in an infrastructure are shown. System 900 includes clients 911, 912 and 917, fire walls 921, 922 and 927, CDN server clusters 931, 932, and 937, metadata servers 940 and source server clusters 950. In one embodiment, the clients 911, 912 and 917 are similar to the user devices 141, 142, 143, and 144 shown in FIG. 1. The metadata servers 940 and source server clusters 950 are remote from the CDN servers similar to the source servers 111, 112, and 119 in FIG. 1. The CDN servers are used as both a cache and also used to generate the metadata of an image file. The original version of an image goes into source servers and are stored there, while the corresponding metadata is stored in metadata servers. If the CDN server performs image processing on the original image, a decision is made regarding whether to store the results of image processing on the CDN server. This new image is also tagged uniquely. Its metadata is generated and managed by metadata servers, and the results of the image processing are stored.

When an image is requested, the query is checked by a metadata server to locate the file and return it with the location information. If this version of the image is already stored, through the concrete physical location, this image is loaded and sent to user. On the other hand, if this version does not exist yet, the original image is loaded and processed by the FPGA processors.

When the stored contents are separated into metadata and user data, each image's metadata is generally the same-length, and the total amount of metadata is proportional to the number of images rather than the total absolute file size. Therefore, even if the image information size increases (e.g., greater resolution, etc.) the drive space required by the metadata does not change much. However, the conventional file system has to make its metadata amount increase in proportion with the size of user data. As the image size becomes bigger and bigger (from tens of kByte to several Mbyte), the metadata size increase becomes more problematic (more complex, consumes more storage resources and bandwidth, it slows the system down, etc.). This image-based storage system enables the use of advanced technologies while conventional approaches reach a practical limit, especially with respect to form size (advanced smaller camera which keeps evolving generates high-resolution, but conventional approaches need complex large storage that is not possible to keep small).

A local CDN server processing system can also enable a NAND page buffer based DRAM-less operation. In one embodiment, the PCIe add-in card has no DRAM on board. Instead, it uses the page buffer in each NAND flash logical unit number (LUN) to hold the data temporarily. The LUN denotes the storage unit. The high-capacity PCIe add-in card has hundreds of LUNs, and each LUN has multiple planes, and each plane has a page cache (e.g., 4 KB, 8 KB, etc.). Therefore, the allocated space from page caches of parallel LUNs is big enough to accommodate the image to be processed and also intermediate results. In this way, data movement between a DIMM and a PCIe device is avoided. This can facilitate savings in CPU resource usage or DMA development efforts. Since the data loading, processing, and storing happen in a single PCIe device, the operation protocol is simplified, the data path is shortened, and the efficiency is improved. Furthermore, for certain data which is not accessed very frequently, it is also put into flash storage temporarily (whereas this data conventionally sat in DRAM). This also further enables DRAM usage reduction.

In one embodiment of a DRAM-less design, the storage system can be considered to have a controller which drives tens of flash dies. A relatively high storage capacity can be achieved on a PCB board that includes tens of integrated flash chips. In one exemplary implementation, a packaged flash chip includes 8 to 16 NAND dies, and the NAND die has 4 planes. That is to say, the controller is able to access hundreds of planes in parallel. In a number of conventional solid state drives (SSDs), to complete the whole programming from controller to NAND flash cell takes a quite long time and consumes considerable power. The programming operation is non-reversible, so the same program-and-verify actions are repeated multiple times to fulfill one programming operation.

An incremental step pulse programming (ISPP) can also be used. The programming voltage is gradually increased with a small step to pull charges into the floating gate of NAND flash, and, consequently, modifies the actual gate voltage for turning on/off each transistor. Each small programming is followed with a read operation to check whether some bitlines or some cells already reached the values to be programmed. If so, those bitlines are switched off and the programming finishes. The ISPP continues until the cells in a page are programmed correctly. This complexity makes the NAND flash take hundreds of micro-seconds or even longer to program.

Figure 10:
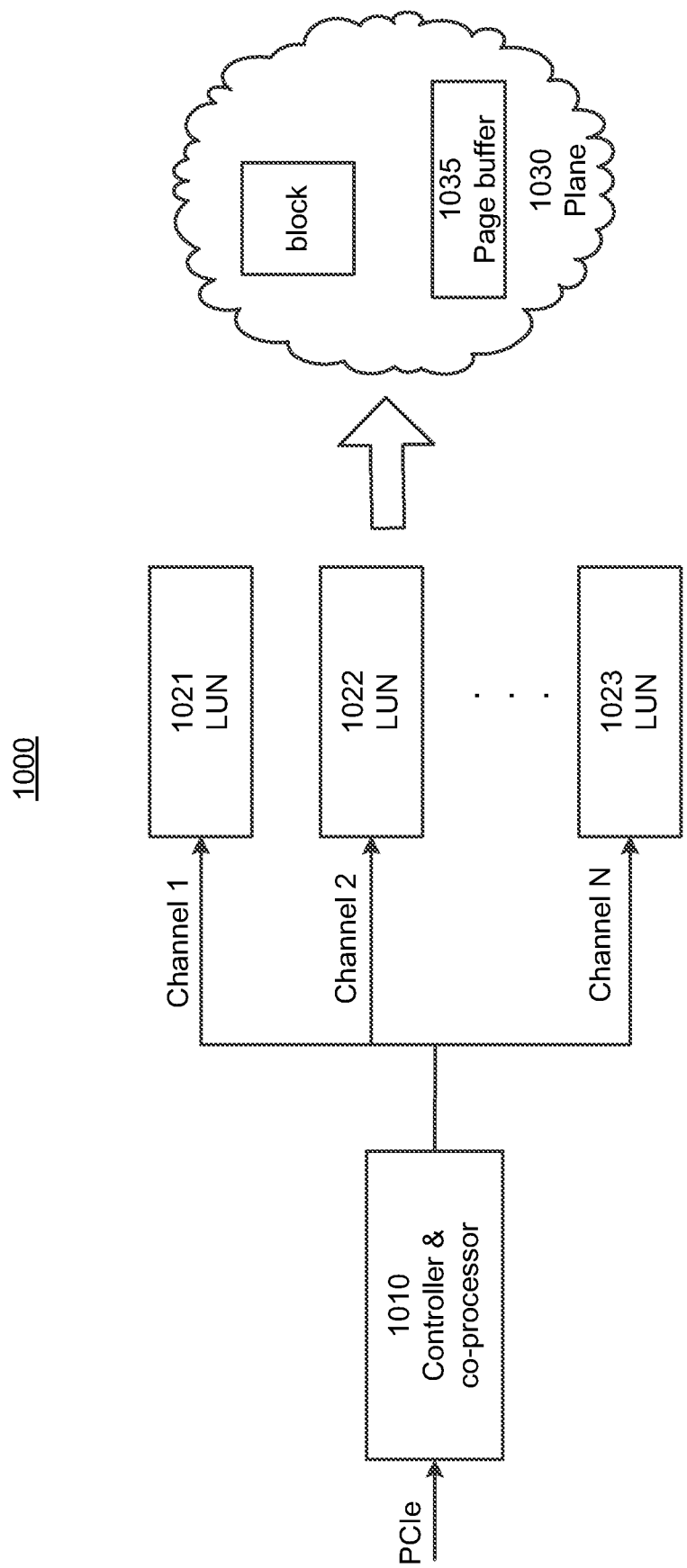
FIG. 10 is a block diagram of an exemplary DRAM-less local CDN server processing environment using page cache and NAND in accordance with one embodiment.

FIG. 10 is a block diagram of an exemplary DRAM-less local CDN server processing environment 1000 using a page cache and a NAND in accordance with one embodiment. The exemplary DRAM-less local CDN server processing environment 1000 includes a FPGA controller and coprocessor 1010, LUNs 1021, 1022, and 1023, and a plane 1030, which includes a page buffer 1035. As is shown in FIG. 10, each NAND flash plane has a page buffer to hold data to be written. The latency to transfer the data from FPGA controller to NAND flash page buffer is much shorter than the data to be written into the NAND flash. In one exemplary implementation, at each moment, only a minority of flash channels are active. Thus, the inactive page buffers can be used for memory purposes to hold the intermediate data. Holding the intermediate data works is used by the FPGA image processor which sits in the same PCIe add-in card, and the processor possesses a high throughput and low latency for image processing. Therefore, the page buffer is occupied and released quickly which does not form a conflict with NAND flash storage usage. By using page buffers, the image processing and storage system does not need to frequently communicate with the server's DRAM through the PCIe bus, and continues to finish the processing locally. This avoids the interaction between CPU and PCIe devices and directly saves response time and CPU resource usage for either interrupt or polling.

The in-memory computing can also ensure there is data consistency and help prevents data loss in case of power failure. The conventional method is to use the DRAM in a server and work with a CPU processor to get an image processed. However, conventional systems typically cannot provide data protection. As long as the power supply is off or instable, the data in DRAM will disappear. On the other hand, a PCIe add-in card has power failure protection with the onboard super capacitor. If the server power supply malfunctions or is interrupted, the super capacitor provides enough charge to write the data from a NAND flash page buffer into the NAND flash which is non-volatile storage.

Integrating an image processor and storage controller into the same FPGA that is close to the NAND flash realizes the concept of in-memory computing. Without passing around the data through the CPU complex, the CPU and memory resource utilization is reduced. An expedited approach of performing the image processing locally on the CDN server helps overcome several conventional problems. The conventional systems typically give rise to a couple of problems. Fetching the processed image results from source servers costs or occupies network bandwidth, which increases TCO equivalently. The BGP bandwidth is usually not free and infrastructure companies are often required to pay fees. Also, frequent accessing of source servers causes more transport burden on networks and adversely effect traffic flow. Another problem for the specific types of computation like image processing is trying to run software using a CPU (which is not typically very efficient at specialized tasks). Considering the expensive CPU resource and the high power consumption, processing images with a CPU usually needs long latency to accomplish the task and is a waste of computation resources.

Thus, the presented local CDN processing systems and methods facilitate efficient image processing and storage. The local CDN processing systems and methods enable faster response to user image requests, reduced consumption of network bandwidth and reduced source server CPU use. The FPGA resources are shared for storage controller and image processor operations in a PCIe flash device. This allows processing burdens to be offloaded from source server CPUs and reduces the expense of the CPU complex (including bus, memory, operating system, etc.). An original image can be selectively copied onto the CDN server and later requests regarding the original image (including processed image requests associated with the original image) can be accomplished by the CDN server. Thus, the network bandwidth utilization on this service is reduced. An image processing service's file access granularity is based on the individual images instead of the same-size block. A unique indexing of images can be used for image operations. The unique indexing assigns a non-repeatable index and ensures the images have their respective index. Therefore, the file management is simplified and consequently, after bypassing the traditional file system, the access to the image is significantly accelerated, and the overhead spent on file system construction and maintenance is reduced. Furthermore, DRAM-less design can exploit the internal page buffer resources inside each Flash LUN, and provide a data buffer functionality similar to a DRAM cache conventional used on an add-in card without actually using a DRAM. Facilitating removal of the DRAM can further reduces the cost, the power consumption and the system design complexity of the add-in card. The caching algorithm for the processed image is developed to balance the storage capacity and the online FPGA processing load.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. An add-in card for image processing and selectively storing information, the add-in card comprising:
   a processing circuit that performs image processing locally on the add-in card and also directs selective image-based storage of original image information and results of the image processing using a unique address tag, wherein the add-in card is included in a content delivery network (CDN) server;
   a solid state storage semiconductor device that selectively stores the original image information and results of the image processing locally on the add-in card; and
   a communication port mechanism that receives the original image information and selectively forwards the original image information and results of image processing on the original image information.

2. The add-in card of claim 1, wherein the processing circuit:
   determines if image processing is required to respond to a request for image information;
   retrieves the original image information if image processing is required;
   performs image processing on the original image information; and
   forwards the results of the image processing in response to the request for image information.

3. The add-in card of claim 1, in which the unique address tag is generated on an image by image basis.

4. The add-in card of claim 3, in which the unique address tag is used to locate corresponding original image information for loading, image processing, and saving.

5. The add-in card of claim 1, in which results of the image processing produce additional image information and an additional unique address tag is associated with the additional image information on an image by image basis.

6. The add-in card of claim 5, in which the solid state storage semiconductor device stores the additional image information and additional unique address tag.

7. The add-in card of claim 1, in which the image information is stored without file system storage management or a logic block address layer.

8. The add-in card of claim 1, in which the processing circuit performs both image processing and storage control.

9. The add-in card of claim 1, in which:
the solid state storage semiconductor device includes a plurality of local NAND dies and a plurality of page buffers, wherein when the page buffers are active for normal storage transfers the page buffers hold data to be written in the plurality of NAND dies and when the page buffers are inactive for normal storage transfers the page buffers are used to store intermediate information; and
the processing circuit includes a field programmable gate array (FPGA) that performs image processing and storage controller operations, including controlling information storage in the plurality of local NAND dies.

10. The add-in card of claim 9, in which the page buffer is an internal page buffer inside a NAND FLASH LUN.

11. An add-in card for image processing and selectively storing information, the add-in card comprising:
a processing circuit that performs image processing locally on the add-in card and also directs selective image-based storage of original image information and results of the image processing using a unique address tag, the processing circuit includes a field programmable gate array (FPGA) that performs image processing and storage controller operations;
a solid state storage semiconductor device that selectively stores the original image information and results of the image processing locally on the add-in card, the solid state storage semiconductor device includes a plurality of local NAND dies and a plurality of page buffers, wherein when the page buffers are active for normal storage transfers the page buffers hold data to be written in the plurality of NAND dies and when the page buffers are inactive for normal storage transfers the page buffers are used to store intermediate information, wherein the processing circuit controls information storage in the plurality of local NAND dies; and
a communication port mechanism that receives the original image information and selectively forwards the original image information and results of image processing on the original image information.

12. The add-in card of claim 11, in which the page buffer is an internal page buffer inside a NAND FLASH LUN.

13. The add-in card of claim 11, the processing circuit performs an evaluation of an image information access trigger, wherein the evaluation determines a selection between a user request directed to original image information and a user request directed to processed image information.

14. The add-in card of claim 11, wherein image information is accessed in accordance with the evaluation, wherein the evaluation includes evaluating if image information is locally stored.

15. The add-in card of claim 11, wherein image information is accessed in accordance with the evaluation, wherein the evaluation includes evaluating if image information is locally stored.

16. The add-in card of claim 12, wherein the processing circuit retrieves image information that is locally stored if the evaluation indicates the information is locally stored.

17. The add-in card of claim 12, a breakpoint associated with intermediate results stored in the solid state storage semiconductor device.

* * * * *